July 1, 1958 T. E. STARR 2,841,061
TAMPING DEVICE
Filed Oct. 5, 1955

INVENTOR
T. E. Starr

BY *A. Yates Dowell.*

ATTORNEY

2,841,061

TAMPING DEVICE

Thomas Edward Starr, Anniston, Ala.

Application October 5, 1955, Serial No. 538,584

4 Claims. (Cl. 94—48)

This invention relates to roadways, walks, foundations, buildings, and other structures including both the production and maintenance thereof and to the equipment employed in their production.

Specifically, the invention relates to a tamper for use in construction work, street maintenance and repair, for tamping, packing or leveling earth, unset cement, bituminus or other substance where it is desired to render more compact, solidify, or change the physical characteristics thereof.

Tampers are desirable in order to render more compact, level or otherwise change a mass of earth, unset plastic composition, or the like, and tampers of various kinds and of various substances have been provided. These primarily have been of rigid construction and therefore lacking in durability on account of the repeated shocks to which they are subjected. Also, since these devices have been of rigid construction, shock has been transmitted to the hands and arms of user.

It is an object of the invention to overcome the difficulties enumerated and to provide a tamper of simple and inexpensive construction, of few and sturdy parts, which has flexibility so that it will not disintegrate due to shock but its durability will be increased indefinitely and the shock or vibration will not be transmitted to the user.

Another object of the invention is to provide a tamper, the life of which is materially increased, which can be used with less fatigue, which will more satisfactorily perform the function for which it was produced, and one in which a shaft is connected to the tamper with an intervening spring, the shaft sliding in a collar attached to the head of the same.

A further object of the invention is to provide a tamper which can be used in connection with a pneumatic hammer, and in which the rigidity is modified to such an extent that continued use will not materially fracture or break the same and the shock will not be imparted to the user.

Other objects and advantages of the invention will become apparent from the following description taken in conjunction with the accompanying drawing wherein.

Figure 1:
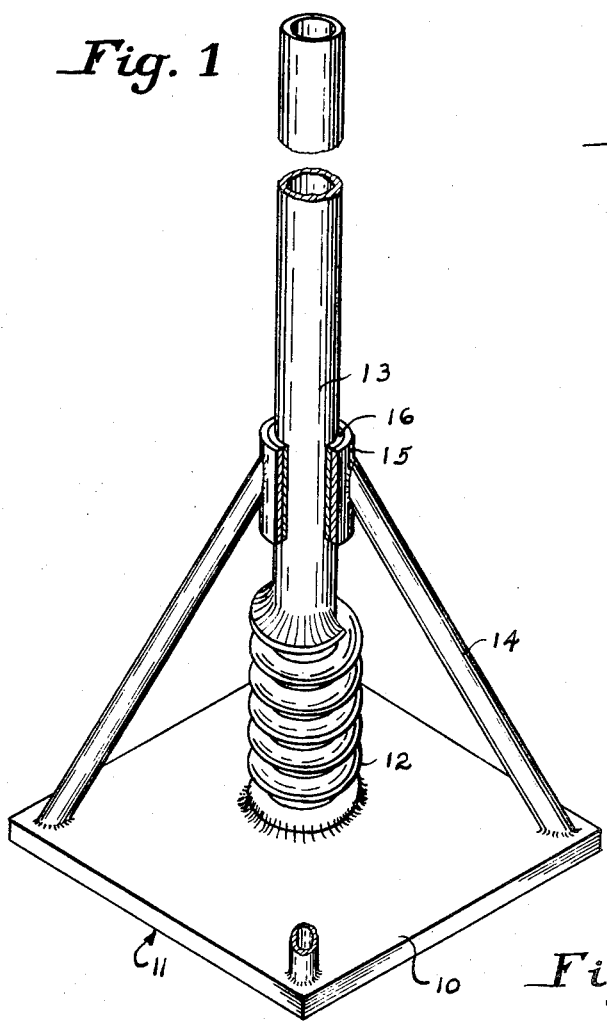
Fig. 1 is a perspective illustrating one application of the invention.
Figure 2:
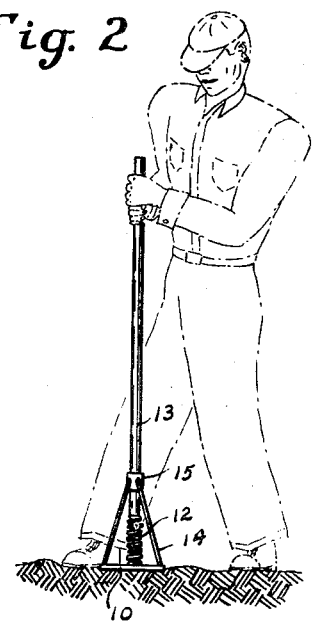
Figs. 2 and 3 are similar views but with the device in different positions of use.
Figure 3:
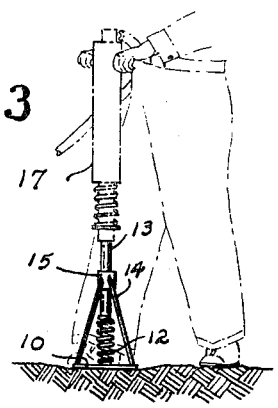

Briefly stated, the present invention comprises a relatively large, thick, flat, heavy, base to the center of the upper surface of which is fixed the lower end of a helical spring with a handle welded to and forming an extension of its upper end, so that during tamping the spring will absorb and prevent the transmission of the shock from the base to the handle and to the operator and prevent disintegration of the tamper. The handle is supported within a bearing in a sleeve held by four braces extending from the sleeve one to each corner of the base and serving to assist in supporting the handle on the spring in upright position at right angles to the base.

With continued reference to the drawing, the tamper of the present invention comprises a base 10 of relatively heavy metal or the like material having a relatively flat lower or tamping surface 11. The base is of sufficiently heavy stock that when raised and lowered its weight will aid in effectively performing the tamping function.

To the center of the upper surface of base 10 is secured, by welding or in any other desired manner, the lower end of a relatively large helical spring 12, and to the upper end of this spring is welded or otherwise secured the lower end of a handle or shaft 13 by means of which the relatively heavy base may be raised and lowered for performing the tamping operation.

The helical spring 12 is disposed axially from the end of the handle 13 and centrally of the base 10. It serves to absorb the shock of the impact between the tamper and the material tamped and prevents the consequent disintegration of the device.

In order to maintain the handle or shaft 13 at right angles to the base or head of the device, and in axial alignment with the spring 12, a series of braces 14 are provided attached by welding or the like, preferably one adjacent each corner of the base plate, with its upper end welded to an encircling sleeve 15 containing a bearing 16 in which the handle is slideable.

The tamper may be operated by placing the base of the tamper on or above the matter to be tamped, grasping the handle 13 and raising the tamper, then forcing it downwardly or allowing it to fall downwardly by gravity while holding the handle. The spring 12 will absorb the major portion of the shock so that the life of the tamper will be increased and the tiring effect on the operator will be decreased.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A tamper comprising a relatively broad, thick metal plate having a substantially flat operating face, a helical spring disposed substantially at right angles to said face, said spring having one end welded to said base, a handle-forming shaft disposed in axial alignment with said spring and having one end welded to said spring, a sleeve about said shaft spaced from the end of said spring and serving as a guide and support for said shaft, and a series of braces connecting said sleeve and the outer portion of said plate.

2. A tamper comprising a relatively heavy base having a relatively broad substantially flat operating face, a coiled spring and having its lower end fixed to said base, an operating handle-forming shaft having one end fixed to the end of said spring remote from said base, said spring and said handle being disposed substantially at right angles to said base, a sleeve encircling said handle, and braces connecting said sleeve and the outer portions of said base.

3. A tamper comprising a substantially large flat base and an upstanding handle disposed substantially at right angles to said base and spring means connecting the lower end of said handle to said base for absorbing shock during the use of the device as a tamper, a sleeve above said spring slidably encircling said handle and bracing means between said sleeve and base retaining said sleeve in fixed substantially normal relationship to said base.

4. A tamper of the character adapted to be grasped by the handle and raised and forceably moved downwardly comprising a relatively broad thick metal plate, a handle disposed substantially centrally of and at right angles to said plate, a sleeve in which said handle is slideable, braces connecting said sleeve in spaced apart positions to said plate in such a manner that said handle will remain substantially at right angles to said plate, and a spring connection between the end portion of said handle and the rear side of said plate.

References Cited in the file of this patent

UNITED STATES PATENTS

| | | |
|---|---|---|
| 1,085,505 | Stafford | Jan. 27, 1914 |
| 1,560,734 | Rook | Nov. 10, 1925 |
| 1,926,193 | Clark | Sept. 12, 1933 |

FOREIGN PATENTS

| | | |
|---|---|---|
| 732,362 | France | June 14, 1932 |